United States Patent [19]

Hall et al.

[11] 4,001,373

[45] Jan. 4, 1977

[54] REMOVAL OF TETRANITROMETHANE FROM TNT PLANT WASTE

[75] Inventors: Thomas N. Hall, Adelphi, Md.; William H. Gilligan, Washington, D.C.

[73] Assignee: The United States of America as represented by the Secretary of the Navy, Washington, D.C.

[22] Filed: Aug. 18, 1975

[21] Appl. No.: 605,775

[52] U.S. Cl. .............................. 423/236; 423/245; 260/644; 260/645
[51] Int. Cl.² ........................................ B01D 53/34
[58] Field of Search ........... 423/236, 245; 260/644, 260/645

[56] References Cited

UNITED STATES PATENTS

| 1,632,959 | 6/1927 | Gartner | 260/644 |
|---|---|---|---|
| 3,125,606 | 3/1964 | Glover et al. | 260/644 |

OTHER PUBLICATIONS

Schultheiss, "Report on Work in Connection with Explosives;" PB 91741, B.I.O.S.5741, 1945, pp. 7/I and 8/I.

Primary Examiner—Earl C. Thomas
Attorney, Agent, or Firm—R. S. Sciascia; A. L. Branning; R. D. Johnson

[57] ABSTRACT

A method of removing tetranitromethane from waste gases (e.g., from trinitrotoluene plants) by scrubbing the waste gases with a solution of (1) water, (2) hydrogen peroxide, and (3) an alkali metal hydroxide or alkali metal carbonate. Tetranitromethane is converted into trinitromethane or a soluble alkali metal salt of trinitromethane.

34 Claims, No Drawings

REMOVAL OF TETRANITROMETHANE FROM TNT PLANT WASTE

BACKGROUND OF THE INVENTION

Untreated waste gases generated in the manufacture of trinitrotoluene contain tetranitromethane and various nitrogen oxides as pollutants. The prior art procedure was to scrub these waste gases with water and concentrated sulfuric acid, removing the nitrogen oxides but not the tetranitromethane. The treated waste gases, still containing tetranitromethane, were then discharged into the atmosphere. However, it has been determined that tetranitromethane is an undesirable pollutant which should be removed from the waste gases before they are vented to the atmosphere.

Although processes for converting tetranitromethane into trinitromethane are known in the prior art, trinitromethane is still expensive and the supply is limited and erratic. Therefore, it would be desirable to develop an economical process for removing tetranitromethane from waste gases and converting it into trinitromethane, $HC(NO_2)_3$, or its salts. For instance, one prior art process uses aqueous potassium hydroxide to reduce tetranitromethane into trinitromethane (nitroform) [see Schmidt, Ber. 52,400 [1919]]. The usefulness of this process is reduced, however, by the simultaneous hydrolysis of the tetranitromethane to potassium carbonate with the corresponding reduction in the yield of the desired trinitromethane product in accordance with the following equations:

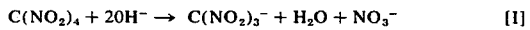

$$C(NO_2)_4 + 2OH^- \rightarrow C(NO_2)_3^- + H_2O + NO_3^- \quad [I]$$

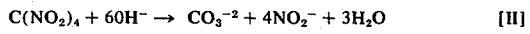

$$C(NO_2)_4 + 6OH^- \rightarrow CO_3^{-2} + 4NO_2^- + 3H_2O \quad [II]$$

The relative yields of the two sets of products formed in these competing reactions depends on the concentrations of tetranitromethane and potassium hydroxide. Unless very high concentrations (over 7 normal) of potassium hydroxide are used, the yield of trinitromethane will be less than 80 percent of the tetranitromethane present in the solution. In tests using an aqueous 0.41 N sodium hydroxide solution as a scrubbing solution, only about 50 percent of the tetranitromethane was removed from waste gases; 75 percent of the tetranitromethane removed was converted into trinitromethane and 25 percent into carbonate ions. This corresponds to the reaction:

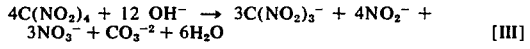

$$4C(NO_2)_4 + 12\ OH^- \rightarrow 3C(NO_2)_3^- + 4NO_2^- + 3NO_3^- + CO_3^{-2} + 6H_2O \quad [III]$$

Thus, the process inherently produces a low yield of trinitromethane. Moreover, the efficiency (amount of tetranitromethane removed from the waste gases) of an aqueous alkali metal hydroxide solution is low because of the low solubility of tetranitromethane in water. For instance an aqueous sodium hydroxide solution of from about 0.4 N to 0.5 N removes only about one half of the tetranitromethane present in the waste gases (see example I). In summary, the use of an aqueous alkali metal hydroxide solution alone is inefficient because of the low solubility of tetranitromethane in water and the competing reaction which converts tetranitromethane into carbonate ions.

In conclusion, it would be desirable to provide a process which would be more efficient in removing tetranitromethane from waste gases and in converting the tetranitromethane into trinitromethane.

SUMMARY OF THE INVENTION

An object of this invention is to provide an efficient method for removing tetranitromethane from exhaust gases produced in the manufacture of trinitrotoluene.

Another object of this invention is to provide an economical source of trinitromethane.

Yet another object of this invention is to provide a reliable source of trinitromethane.

These and other objects of the invention are accomplished by scrubbing waste gases containing tetranitromethane with a solution comprising (1) water, (2) hydrogen peroxide, and (3) a hydroxyl ion source selected from the group consisting of ZOH, $Z_2CO_3$, and mixtures thereof wherein Z is selected from the group consisting of $Li^+$, $Na^+$, $K^+$, $Cs^+$, $Rb^+$, and mixtures thereof.

DETAILED DESCRIPTION OF THE PREFERRED EMBODIMENT

A standard gas scrubber may be used in the practice of this invention. The liquid scrubbing solution is cycled through the scrubber and the exhaust gases are passed through the scrubber counter-current to the scrubbing solution. Usually, this involves allowing the liquid scrubbing solution to flow down through the scrubbing column while the exhaust gases flow up through the column. The scrubbing process is usually run at ambient outdoor temperatures. Obviously where necessary, the solution may be heated to prevent it from freezing.

The scrubbing mixture comprises (1) water, (2) hydrogen peroxide, and (3) a hydroxyl ion source which is an alkali metal hydroxide, alkali metal carbonate, or mixtures thereof. Therefore, LiOH, NaOH, KOH, CsOH, RbOH, $Li_2CO_3$, $Na_2CO_3$, $K_2CO_3$, $Cs_2CO_3$, $Rb_2CO_3$, or mixtures thereof may be used. Of these KOH, NaOH, $K_2CO_3$, and $Na_2CO_3$ are preferred because they are least expensive. Sodium hydroxide and sodium carbonate are more preferred because the salt sodium trinitromethane is much more soluble in water than the salt potassium trinitromethane is. The greater solubility of the sodium trinitromethane permits a more highly concentrated aqueous solution of trinitromethane which is more economical to transport and to convert into trinitromethane.

The basic solutions used in the present invention trap carbon dioxide from the waste gases. As a result, an alkali metal hydroxide solution will be converted into an alkali metal carbonate solution after approximately one day of scrubbing.

In the discussion and examples which follow, the term "efficiency" refers to the percentage of tetranitromethane which is removed from the exhaust gases during the scrubbing process; the term "yield" refers to the percentage of tetranitromethane which is removed from the exhaust gases and converted into trinitromethane or one of its salts.

As stated in the background of the invention, if an aqueous alkali metal hydroxide solution is used alone, the efficiency and yield of the scrubbing process will be low. However, by adding hydrogen peroxide to the scrubbing solution the following reaction predominates:

$$OH^- + HOO^- + C(NO_2)_4 \rightarrow C(NO_2)_3^- + NO_2^- + O_2 + H_2O \qquad (IV)$$

As examples II, III, and IV show, the yield and efficiency is greatly increased. Apparently the reaction of equation IV is fast enough to compensate for the low solubility of tetranitromethane in water and to greatly reduce the amount of tetranitromethane which is converted into carbonate ions by the reaction of equation II.

Ordinary hydrogen peroxide decomposes in basic solutions. As a result, it will be necessary to add additional hydrogen peroxide during the process to replace not only the hydrogen peroxide which is used up in the conversion of tetranitromethane into a trinitromethane salt but also to replace the hydrogen peroxide which decomposes in the basic solution. It is preferable to use hydrogen peroxide which has been stabilized for use in basic solutions. For example, magnesium sulfate-stabilized hydrogen peroxide works well. Similarly, hydrogen peroxide containing organic sequestering agents, such as ethylene diamine tetraacetic acid, may also be used. Base stabilized hydrogen peroxide solutions are available from duPont, FMC, Pittsburg Plate Glass, Shell Oil, and other corporations.

Although any concentration of hydrogen peroxide is operable for the scrubbing process, it is preferred to maintain a hydrogen peroxide concentration of from about 0.5 to about 5.0 percent by weight. Concentrations above 5.0 percent are unnecessary for the process and merely result in an increased amount of hydrogen peroxide being wasted through decomposition. This is true for the stabilized as well as the unstabilized hydrogen peroxide because stabilized hydrogen peroxide also decomposes in basic solution, although at a slower rate than the unstabilized hydrogen peroxide. At the lower end of the range, at least 0.5 percent by weight hydrogen peroxide is preferred to assure good efficiency and yield for the process.

The process of the present invention should be operable for any concentration of hydroxyl ions greater than $10^{-7}$ N; however, it is preferred that the hydroxyl ion concentration be in the range of from about 0.1 N to about 0.5 N. It should be noted that high hydroxyl ion concentrations cause excessive decomposition of the hydrogen peroxide. Further, if too much base is used tetranitromethane will be salted out. Moreover, if the hydroxyl ion concentration is too high, the trinitromethide ion will decompose. Fortunately, because the peroxide ion (HOO$^-$) is much more reactive with tetranitromethane than the hydroxyl ion is, a much lower hydroxyl ion concentration can be used when the scrubbing solution contains hydrogen peroxide. Yet, if the hydroxyl ion concentration is too low, the trinitromethide ion will also rapidly decompose. For this reason, sodium bicarbonate, a very weak base, cannot be used in the scrubbing process of the present invention. It should also be noted that the trinitromethide ions decompose violently in acid solution. Thus, if the hydroxyl ion concentration is increased to too high a level or allowed to decrease to too low a level, the desired product (trinitromethide ions) will decomposed.

It can be seen from this, that the hydroxyl ion concentration must be carefully regulated if a good yield of the alkali metal trinitromethide salt is to be obtained. As a consequence, if alkali metal hydroxides (strong bases) are used, they must be added frequently and in small amounts. This will be inconvenient for most plant scale operations. It has been discovered, however, that even large excesses of alkali metal carbonates will not produce a hydroxyl ion concentration high enough to adversely affect the stability the trinitromethide ion. In other words, an excess of alkali metal carbonate creates a solution which is buffered at just the right pH for good yields. This means that larger quantities of alkali metal carbonates may be added at much less frequent intervals than is possible with the alkali metal hydroxides. Therefore, the alkali metal carbonates are preferred over the alkali metal hydroxides as a hydroxyl ion source in the process of the present invention.

Finally, note that the scrubbing process of the present invention is intended to supplement and not to replace, the water and sulfuric acid scrubbing process. Preferably, the waste gases should be scrubbed first with the sulfuric acid scrubbing solution to remove the nitrogen oxides and then be treated with the process of the present invention. In this way, the formation of salts in the scrubbing solution of the present invention will be minimized.

The general nature of the invention having been set forth, the following examples are presented as specific illustrations thereof. It will be understood that the invention is not limited to these examples but is susceptible of different modifications that will be readily recognized by one of ordinary skill in the art.

FOR EXPERIMENTS I THROUGH IV

A glass scrubber 2 inches in diameter was packed with pyrex helices to a height of 12 inches was used in these experiments. The conditions in the following examples were adjusted to correspond in scale to actual conditions found at the Radford Army Ammunition Plant, Radford, VA.

In these examples, efficiency refers to the percentage of tetranitromethane which was removed from the air stream. Yield refers to the percentage of tetranitromethane which was removed from the air stream and converted into nitroform or one of its salts.

EXAMPLE I

The scrubber reservoir was charged with 243 ml. of 0.41 N NaOH which was circulated at a rate of 910 cc/min. An air stream containing 400 ppm (V/V) of tetranitromethane was passed up through the scrubber counter-current to the NaOH solution at a rate of 6 cubic feet per hour. After 6 hours the aqueous solution was collected and analyzed. The yield of nitroform was 39 percent; the efficiency was 52 percent.

EXAMPLE II

The scrubber reservoir was charged with 260 cc of 0.5 N NaOH containing 13 ml of 30 percent $H_2O_2$ which was circulated through the scrubber at a rate of 910 cc/min. An air stream containing 400 ppm (V/V) of tetranitromethane was passed up through the scrubber counter-current to the aqueous NaOH—$H_2O_2$ solution at a rate of 6 cubic feet per hour. After 3 hours an additional 10 ml of 30 percent $H_2O_2$ was added and after 6 hours the aqueous NaOH—$H_2O_2$ was collected and analyzed. The yield of trinitromethane was 76 percent and, therefore, the efficiency of removal of tetranitromethane from the gas was at least 76 percent.

EXAMPLE III

The scrubber reservoir was charged with 270 ml of 0.2 N NaOH containing 20 mls of Albone DS 50 (duPont) a stabilized form of $H_2O_2$, which was circulated through the scrubber at a rate of 670 cc/min. An air stream containing 510 ppm (V/V) was passed up through the scrubber counter-current to the scrubbing solution at a rate of 6 cubic feet per hour. After 3 hours of operation an additional 2 gm. of NaOH was added to the scrubber solution. After 6 hours the scrubber solution was analyzed and it was found that the yield of trinitromethane was 90 percent. The efficiency of the removal of tetranitromethane from the gas was then at least 90 percent.

EXAMPLE IV

The scrubber reservoir was charged with 350 ml of 0.23 M $Na_2CO_3$ containing 5 ml $MgSO_4$ — stabilized 50% $H_2O_2$, was circulated through the scrubber at the rate of 910 cc/min., an air stream containing 423 ppm (V/V) of tetranitromethane was passed through the scrubber counter-current to the aqueous $Na_2CO_3$—$H_2O_2$ solution at a rate of 6 cubic feet per hour. After 3 hours, an additional 5 ml of the $MgSO_4$ — stabilized $H_2O_2$ was added, and after 6 hours the aqueous $Na_2CO_3$—$H_2O_2$ solution was collected and analyzed. The yield of trinitromethane was 77%, and, therefore, the efficiency of removal of tetranitromethane from the gas was at least 77%.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A gas scrubbing process for removing tetranitromethane from trinitrotoluene plant waste gases comprising scrubbing the waste gases with a solution of (1) water, (2) hydrogen peroxide, and a hydroxyl ion source selected from the group consisting of ZOH, $Z_2CO_3$, and mixtures thereof wherein Z is selected from the group consisting of $Li^+$, $Na^+$, $K^+$, $Cs^+$, $Rb^+$ and mixtures thereof.
2. The process of claim 1 wherein the hydroxyl ion source is $Z_2CO_3$ wherein Z is selected from the group consisting of $Li^+$, $Na^+$, $K^+$, $Cs^+$, $Rb^+$, and mixtures thereof.
3. The process of claim 2 wherein hydrogen peroxide constitutes from about 0.5 to about 5 percent by weight of the solution.
4. The process of claim 3 wherein the hydroxyl ion concentration is from about 0.1 N to about 0.5 N.
5. The process of claim 4 wherein Z is selected from the group consisting of $Na^+$, $K^+$, and mixtures thereof.
6. The process of claim 5 wherein Z is $Na^+$.
7. The process of claim 2 wherein the hydroxyl ion concentration is from about 0.1 N to about 0.5 N.
8. The process of claim 7 wherein Z is selected from the group consisting of $Na^+$, $K^+$, and mixtures thereof.
9. The process of claim 8 wherein Z is $Na^+$.
10. The process of claim 1 wherein the hydroxyl ion source is ZOH wherein Z is selected from the group consisting of $Li^+$, $Na^+$, $K^+$, $Cs^+$, $Rb^+$, and mixtures thereof.
11. The process of claim 10 wherein hydrogen peroxide constitutes from about 0.5 to about 5 percent by weight of the solution.
12. The process of claim 11 wherein the hydroxyl ion concentration is from about 0.1 N to about 0.5 N.
13. The process of claim 12 wherein Z is selected from the group consisting of $Na^+$, $K^+$, and mixtures thereof.
14. The process of claim 13 wherein Z is $Na^+$.
15. The process of claim 10 wherein the hydroxyl ion concentration is from about 0.1 N to about 0.5 N.
16. The process of claim 15 wherein Z is selected from the group consisting of $Na^+$, $K^+$, and mixtures thereof.
17. The process of claim 16 wherein Z is $Na^+$.
18. The process of claim 1 wherein the hydrogen peroxide is stabilized against decomposition caused by hydroxyl ions.
19. The process of claim 18 wherein the hydroxyl ion source is $Z_2CO_3$ wherein Z is selected from the group consisting of $Li^+$, $Na^+$, $K^+$, $Cs^+$, $Rb^+$, and mixtures thereof.
20. The process of claim 19 wherein hydrogen peroxide constitutes from about 0.5 to about 5 percent by weight of the solution.
21. The process of claim 20 wherein the hydroxyl ion concentration if from about 0.1 N to about 0.5 N.
22. The process of claim 21 when Z is selected from the group consisting of $Na^+$, $K^+$, and mixtures thereof.
23. The process of claim 22 wherein Z is $Na^+$.
24. The process of claim 19 wherein the hydrogen ion concentration is from about 0.1 N to about 0.5 N.
25. The process of claim 24 wherein Z is selected from the group consisting of $Na^+$, $K^+$, and mixtures thereof.
26. The process of claim 25 wherein Z is $Na^+$.
27. The process of claim 18 wherein the hydroxyl ion source is ZOH wherein Z is selected from the group consisting of $Li^+$, $Na^+$, $K^+$, $Cs^+$, $Rb^+$, and mixtures thereof.
28. The process of claim 27 wherein hydrogen peroxide constitutes from about 0.5 to about 5 percent by weight of the solution.
29. The process of claim 28 wherein the hydroxyl ion concentration is from about 0.1 N to about 0.5 N.
30. The process of claim 29 wherein Z is selected from the group consisting of $Na^+$, $K^+$, and mixtures thereof.
31. The process of claim 30 wherein Z is $Na^+$.
32. The process of claim 27 wherein the hydroxyl ion concentration is from about 0.1 N to about 0.5 N.
33. The process of claim 32 wherein Z is selected from the group consisting of $Na^+$, $K^+$, and mixtures thereof.
34. The process of claim 33 wherein Z is $Na^+$.

* * * * *